G. W. Eddy.
Railway-Car.
Nº 74,325 — Patented Feb. 11, 1868.
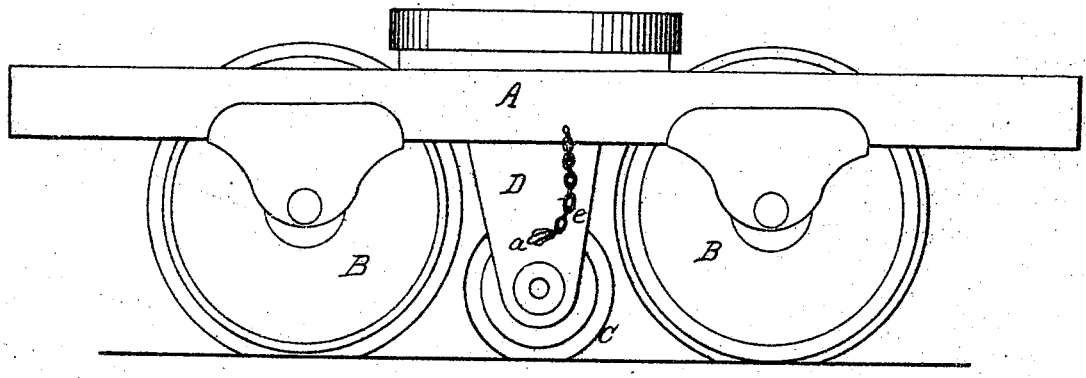
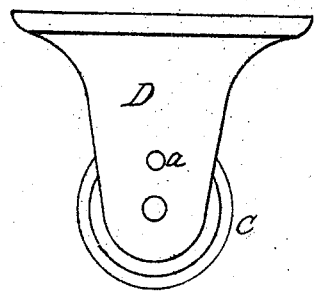
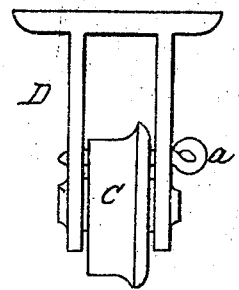
Witnesses
P. T. Dodge
J. M. Dodge
Inventor
George W. Eddy
by Dodge & Munn
his Attys.

United States Patent Office.

GEORGE W. EDDY, OF WATERFORD, NEW YORK.

Letters Patent No. 74,825, dated February 11, 1868.

IMPROVEMENT IN RAILWAY-CARS.

*The Schedule referred to in these Letters Patent and making part of the same.*

TO ALL WHOM IT MAY CONCERN:

Be it known that I, GEORGE W. EDDY, of Waterford, in the county of Saratoga, and State of New York, have invented certain new and useful Improvements in Railroad-Cars; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in providing cars with extra wheels, so arranged that when the ordinary wheels or axles are broken or otherwise disabled, the weight of the car will be thrown upon and supported by the extra wheels provided for that purpose.

Figure 1 is a side elevation of an ordinary car-truck, with my improvement applied thereto.

Figure 2 is a side elevation of the extra wheel and its frame, detached.

Figure 3 is a front elevation of the same.

It is well known that frequent and oftentimes serious accidents occur, in consequence of the breaking of one or more of the wheels or axles of cars, by which means the cars are thrown from the track. To obviate these difficulties is the object of my present invention, and to accomplish that object I provide the trucks of cars with an extra wheel on each side, so arranged that whenever either of the ordinary wheels is disabled, either by the breaking of the wheel or its axle, then the extra wheel shall come into operation, and serve as a support in place of those disabled.

In the drawings, A represents the frame of an ordinary car-truck, provided with four wheels, B, in the usual manner. Between each of the two wheels B, on one side of the truck, I locate an extra wheel, C, as represented in fig. 1. This wheel C is made of such a size as to permit it to be located in line with and between the wheels B on the side of the truck, and is arranged to be held suspended directly over, but clear from, the rail on which the other wheels travel, as represented in fig. 1. This wheel C may be secured in place in any suitable manner, but I prefer to mount it in a metallic yoke or frame, D, the form of which may be as represented in figs. 2 and 3, it having pendants to receive and support the journal or axis of the wheel C, and being also provided with suitable flanges, by which it may be securely bolted to the truck, as represented in fig. 1. It will be understood that each side of the truck is provided with one of these extra wheels, and that both may be attached to one axle; and, as represented in fig. 1, I prefer to locate them centrally, lengthwise, of the truck, as by so doing a less number of them is required.

With a car thus supplied with extra wheels for each truck, it will be seen that in case either of the wheels B should become displaced, either by the breaking of any of them or of their axles, then the extra wheel, C, on that side will rest on the rail, and serve as a support to the car, thus preventing the car from being thrown from the track or otherwise injured, as would be the case if not thus supported. By locating the extra wheels, C, midway of the truck, they are brought directly under the bolster or point where the body of the car is attached to and rests on the truck, so that if all of the ordinary wheels, B, were broken or removed, still the two extra wheels, C, would support the truck, and enable the car to be drawn along to a station or switch, where it could be removed from the track.

In order to make these extra wheels serve as a self-operating brake when they first strike the rail, in consequence of the breaking of the other parts, and thus assist to check the speed of the train—it being necessary, in such cases, to stop in order to remove the broken parts from the track, &c.—I bore a hole through the wheels C, and insert therein a strong pin or bolt, $a$, as represented more clearly in fig. 3, the pin $a$ resting also in holes in the frame D, as represented, or against the edge of the frame, in such a way as to prevent the wheel C from rotating, and thereby causing it to slide on the rail. In this way it will serve as a brake, and assist to stop the train; and when ready to proceed, the pin $a$ will be withdrawn, and the wheel permitted to roll as usual, the pin $a$ being attached by a chain or cord, $e$, to the truck to prevent its being lost when not in use, there being also a hook on the side of the truck on which to hang the pin up out of the way, when removed from the wheel C. By this improvement I thus accomplish the twofold object of providing a support for the car, on which it can be moved almost if not quite as well as before the main wheels were broken, and also a means of assisting to stop the train in case of an accident occurring, as described.

It is obvious that my improvement may be applied to cars already in use as well as to those hereafter to be constructed. It is also obvious that instead of locating the extra wheels between the others, as described, they may be placed at the ends of the truck; but in that case there would be two pairs required, one at each end, in order to support and balance the truck; whereas, by my arrangement, one pair will answer, it only being necessary, in case all the main wheels are removed or disabled, to so block or secure the truck as to keep it properly in line with the car, and prevent it from turning sidewise and running off the track.

Having thus described my invention, what I claim, is—

The construction and arrangement of the extra wheel C, in connection with the car-truck, in such a manner as to admit of its being used as a support and brake, and also as a revolving wheel, in the manner and for the purpose herein described.

GEO. W. EDDY.

Witnesses:
   H. B. MUNN,
   P. T. DODGE.